United States Patent [19]
Pinard et al.

[11] Patent Number: 5,940,834
[45] Date of Patent: *Aug. 17, 1999

[54] AUTOMATIC WEB PAGE GENERATOR

[75] Inventors: Debbie Pinard, Kanata; Richard Deadman, Ottawa, both of Canada

[73] Assignee: Mitel Corporation, Kanata

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,270

[22] Filed: Mar. 13, 1997

[51] Int. Cl.$^6$ .................................................. G06F 17/30
[52] U.S. Cl. ......................... 707/102; 707/10; 707/505; 707/507; 707/508; 707/513
[58] Field of Search .............................. 707/102, 10, 513, 707/507, 508, 505

[56] References Cited

U.S. PATENT DOCUMENTS

| | | | |
|---|---|---|---|
| 4,933,514 | 6/1990 | Bowers | 345/160 |
| 5,732,074 | 3/1998 | Spaur et al. | 370/313 |
| 5,732,216 | 3/1998 | Logan et al. | 395/200.33 |
| 5,742,768 | 4/1998 | Gennaro et al. | 1/1 |
| 5,745,754 | 4/1998 | Lagarde et al. | 1/1 |
| 5,761,662 | 6/1998 | Dasan | 707/10 |
| 5,768,510 | 6/1998 | Gish | 395/200.33 |
| 5,778,367 | 7/1998 | Wesinger, Jr. et al. | 707/10 |
| 5,819,271 | 10/1998 | Mahoney et al. | 707/9 |
| 5,835,712 | 11/1998 | DuFresne | 395/200.33 |
| 5,838,918 | 11/1998 | Prager et al. | 395/200.51 |

FOREIGN PATENT DOCUMENTS

| | | | |
|---|---|---|---|
| 0802491A2 | 10/1997 | European Pat. Off. | G06F 17/30 |
| 0822502A1 | 2/1998 | European Pat. Off. | G06F 17/30 |
| 0827090A2 | 3/1998 | European Pat. Off. | G06F 17/30 |
| WO 97/04258 | 2/1997 | WIPO | F16K 17/196 |

OTHER PUBLICATIONS

European Patent Search Report, Application No.: GB 9805270.7, Aug. 28, 1998.

"Computer Database: Web publishing equipment demonstrations", *Seybold report on publishing systems,* vol. 25, No. 4, P.S12(11), (Oct. 23, 1995).

*Primary Examiner*—Paul R. Lintz
*Assistant Examiner*—Ella Colbert
*Attorney, Agent, or Firm*—Schwegman, Lundberg, Woessner and Kluth, P.A.

[57] ABSTRACT

The web page generator of the present invention provides for automatic web page creation of an organizational directory for use in an Internet and Intranet environment. The web page directory is created from data stored in the directory application component of the web page generator and, after being placed on a web server, allows any individual who has network access to the web server offering the web page to view the directory information in a web page format. In another aspect of the present invention, the web page generator generates the directory web pages dynamically on an as requested basis. In another aspect of the present invention, the web page generator also provides for an interface to a Private Branch Exchange (PBX) telephone switch for automatic access to PBX functions through the web page automatically generated in accordance with the principles of the invention.

10 Claims, 9 Drawing Sheets

```
<!DOCTYPE HTML PUBLIC "-//IETF//DTD HTML//EN" []>

<HTML>

<HEAD>

<TITLE>      415a

"(John Smith) Web Page"

</TITLE>

</HEAD>

<BODY>

<H1>      415b (John Smith) Web Page</H1>

<P>            415c

Full Name: (John Smith) <BR>
                      425
Title: (Sales Manager) <BR>
                    435
Phone: ((999) 555-1312) <BR>
                              445
Address: (Building C, Main Campus) <BR>   455

Email Address: (J.Smith@thecompany.com) <BR>

</BODY>

</HTML>
```

FIG.5

```
<!DOCTYPE HTML PUBLIC "//IETF//DTD HTML//EN" [ ] >
<HTML>
<HEAD>
<TITLE."Company Main Web Page"
</TITLE>
</HEAD><BODY
<H1>
<H2>
List of Employees                         665
</H2><AHREF="jsmith.htm ".
John Smith          699
</A><BR><A HREF="tjones.htm">
Tim Jones                               698
</A><BR><A HREF="jhanc.htm ">
Johnathan Hancock
                              615
</A><BR><A HREF="fbend.htm".
Freddie Bender
</A><HR><ADDRESS>
Company, 1234 Main Street, Software Valley, 90210,(999) 555-1312
</ BODY>
</HTML>
```

FIG.7

"Company Main Web Page"

Company Main Web Page

List of Employees

(John Smith) ← 715

Tim Jones (Johnathan Hancock) ← 798

Freddie Bender

---

Company, 1234 Main Street, Software Valley, 90210, (999) 555-1212

FIG.8

AUTOMATIC WEB PAGE GENERATOR

FIELD OF THE INVENTION

This invention relates generally to the field of computer network applications, and in particular a web page generator for automatic generation of web pages in Internet and Intranet environments.

BACKGROUND TO THE INVENTION

With the advent of network communications, more and more organizations are becoming interested in taking advantage of new features and functionality that network applications provide. One of the useful features provided by networked communication is allowing individuals in an organization or members of the public to obtain information about other individuals associated with a particular organization.

Large organizations in which individuals are geographically spread out or in which there is a high degree of employee movement or turnover suffer from a problem of not being able to locate, contact and obtain information on different individuals within the organization. A present solution to this problem is to publish (on paper) an organizational or corporate directory listing of names, departments, telephone numbers and other contact information relating to individuals within the organization. The distribution of such a corporate directory to all persons interested in its contents presents an enormous logistical problem.

With the advent of Intra-company and Inter-company communications, as well as network access to organizational computer systems, a computer application may be loaded onto a computer server so that individuals are able to obtain immediate and current access to the organization's resources.

With more and more companies and organizations implementing internal networks and connecting themselves to the Internet, Internet based applications are proliferating.

The task facing organizations wishing to publicize information about individuals within, is to create an accurate, accessible, easy to use and up-to-date mechanism to store and display personal information about each of those individuals. A traditional solution is to create a specialized computer application which stores such information. However, setting up such an application requires a high level of skill. When persons set up such applications are not adequately skilled and knowledgeable the results are often haphazard and fraught with bugs. There are often problems in making the application accessible to the public.

SUMMARY OF THE INVENTION

The web page generator of the present invention provides automatic web page creation of an organizational directory for use in an Internet and Intranet environment. The web page directory is created from data stored in the directory application component of the web page generator and after being placed on a web server, allows any individual who has network access to the web server offering the web page to view the directory information in a web page format. In another aspect of the present invention, the web pages are created by the web page generator at the time the user makes a request for display of that web page. In a further aspect of the present invention, the web page generator also provides for an interface to a Private Branch Exchange (PBX) telephone switch for automatic access to PBX functions through the web page automatically generated in accordance with the principles of the invention.

According to one aspect of the present invention, there is provided a method for automatic generation of a web page organizational directory comprising:

a) creating and saving a member web page template and parent web page template each containing fields for storing specific information;

b) inputting member information into a directory database for each of a plurality of members;

c) retrieving the member web page template and the member information from the database;

d) for each of the plurality of members replacing the fields in the member web page template with the member information and saving the member web page template with the fields replaced with the member information as a member specific web page;

e) retrieving the parent web page template;

f) for each member in the database, inserting the member information regarding each member from the database into the fields of the parent web page template and creating links to associate each member whose member information has been inserted into the fields of the parent web page template to the member specific web page to create a new parent web page; and g) posting each member specific web page and the parent web page to a web server.

According to another aspect of the present invention, there is provided a method for automatic generation of a web page organizational directory comprising:

a) inputting and saving member information into a directory database for each of a plurality of members;

b) creating one or more associative data gathering and formatting mechanisms for searching the directory database, generating in web page format, a list of selected elements relating to each of the members and sending the list to a requesting unit;

c) creating and saving a parent web page template containing one or more activation fields that is each associated with one of the data gathering and formatting mechanisms for activating the associated data gathering and formatting mechanism;

d) posting the parent web page template to a web server;

e) activating the activation field on the parent web page from the requesting unit;

f) displaying the directory list on the requesting unit.

According to another aspect of the present invention, there is provided in an environment where directory information is accessible on a network device, a method for automatic generation of a web page organizational directory comprising:

a) creating one or more data gathering mechanisms for accessing, searching and retrieving directory information from the network device and delivering the information to a data formatting mechanism;

b) creating one or more data formatting mechanisms for generating in web page format a list of selected elements received from the data gathering mechanism and sending the list to a requesting unit;

c) creating and saving a parent web page template containing one or more activation fields for activating an associated data gathering mechanism;

d) posting the parent web page template to a web server;

e) activating the activation field on the parent web page from the requesting unit;

f) displaying the directory list on the requesting unit.

DESCRIPTION OF THE DRAWINGS

A detailed description of the preferred embodiment is provided herein below, with reference to the following drawings, in which:

FIG. 5 is an example of HTML template code for an employee web page generated according to the present invention;

FIG. 7 is an example of HTML template code for a company web page, which is a parent web page linking to various sub pages, generated according to the present invention; and FIG. 8 is an example of the web page generated from the HTML code of FIG. 7.

DETAILED DESCRIPTION OF THE PREFERRED EMBODIMENT

Figure 1:
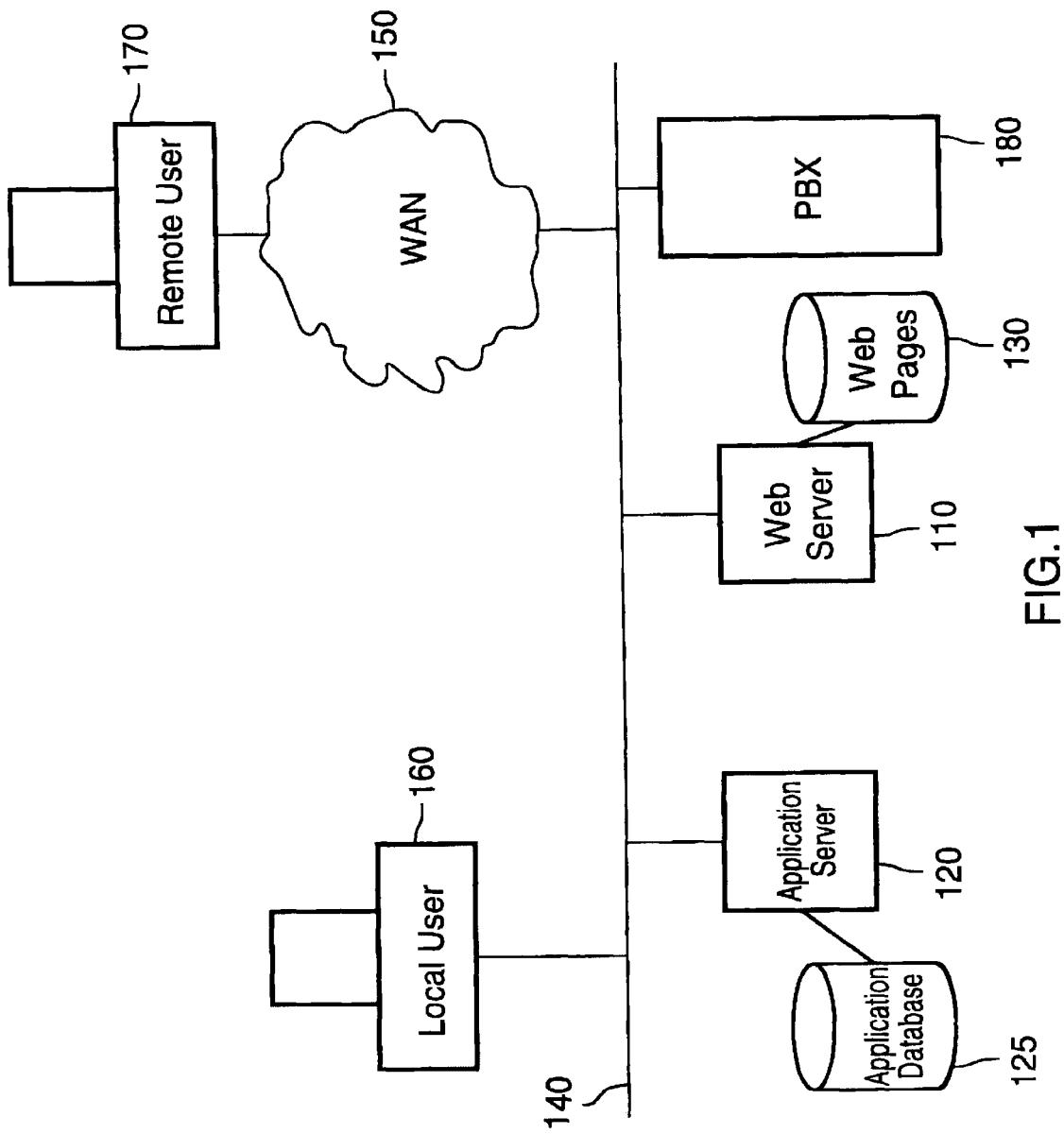
FIG. 1 is a block diagram depicting an overview of a network system for implementing the web page generator of the present invention.

Turning to FIG. 1, web server 110 is connected to local area network 140. Web server 110 is a standard Internet or Intranet computing machine, as is well known in the art, that is capable of displaying web pages of Hypertext Markup Language (HTML) format. HTML is a markup system used to create Hypertext documents that are portable from platform to platform. To accomplish this, it uses the Internet Hypertext Transfer Protocol (HTTP) which allows transfer of information from client to server. It is an application that is designed to conform to International Standard ISO 8879—Standard Generalized Markup Language. HTML and HTTP standards are managed by an Industry Consortium, the World Wide Web Consortium (W3C) jointly hosted by the Massachusetts Institute of Technology Laboratory for Computer Science [MIT/LCS] in the United States, the Institut National de Recherche en Informatique [INRIA] in Europe, and the Keio University Shonan Fujisawa Campus in Asia. In the preferred embodiment, the web server 110 supports the Common Gateway Interface (CGI) and is capable of running CGI programs. CGI is a publicly available method, used by web servers and web clients to mediate interaction between them.

Directory web pages generated by the present invention are stored in computer memory 130 of web server 110 and are made accessible to local user 160 and/or remote user 170 at the discretion of the administrator of the web server 110. Local user 160 and remote user 170 can use a standard web browser, such as Netscape™ from Netscape Communication Corporation or Microsoft Internet Explorer™ from Microsoft Corporation, which can read HTML coded web pages to display directory web pages stored in memory 130 and can communicate with web server 110 using CGI. In the operation of the present invention in an Intranet environment, local user 160 who is connected to local area network 140, obtains access to web server 110 wherein directory web pages stored in memory 130 are offered and displayed. For administration purposes, local user 160 may also be an administrator who runs the directory application and web page generator stored in application database 125 on application server 120. For Internet access, remote user 170, via wide area network 150, obtains access to web server 110 through local area network 140 to display directory web pages stored in memory 130.

The directory application and web page generator is executed by a user who has administrator access to the directory application and web page generator stored in application database 125 on application server 120. The directory application in the preferred embodiment may be written in any appropriate computer language that provides for data entry and control, and storage of information to database 125 in a network environment. For example "C" may be used as the programming language and ORACLE may be used as the database, but the invention is not limited to being implemented in this language or database. In an alternate embodiment, the application could be written as a CGI program, which is accessed through the network environment by an administrator using a standard web browser. The application is described in further detail with reference to the Figures that follow.

In an alternate embodiment (not shown), application server 120 and web server 110 may be the same physical machine.

Figure 2:
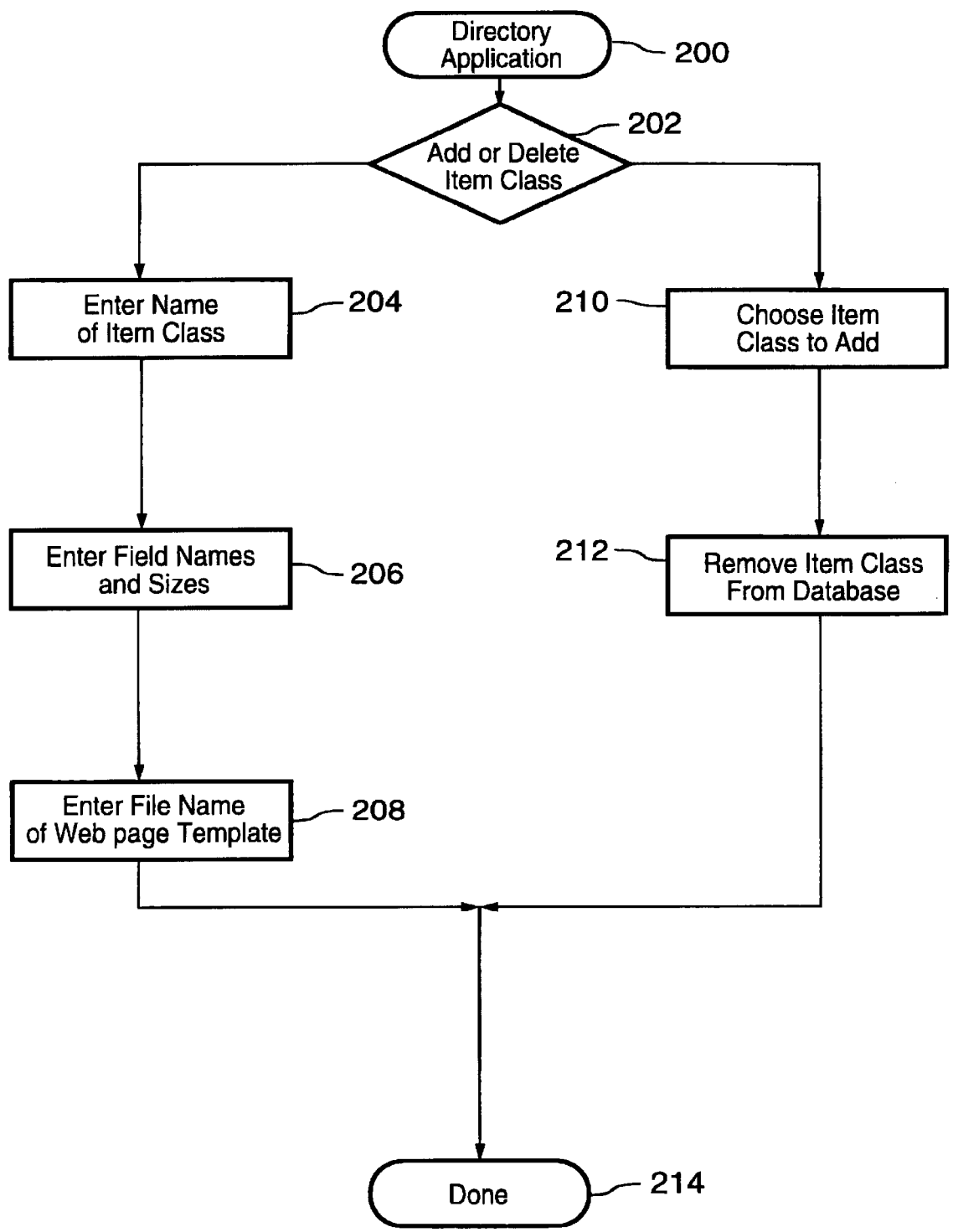
FIG. 2 is a flow chart of a directory application according to the present invention showing the typical basic steps for adding or deleting a directory item class.

Turning to FIG. 2, a flow chart example is provided of the logic of the directory application for adding or deleting an item class. The information stored by the application, and ultimately displayed by the web page is categorized by item. It is therefore necessary to create a list in the database of the various classes of items. An item may be an employee, work group, communications group, room, resource, project or any other appropriate name for grouping people or resources. To create a class of items, the class must be given a name, and assigned an HTML template to be used for a specific instance of that class. An example of a template is described in greater detail below with respect to FIG. 5.

At step 200, the directory application and web page generator is started on application server 120. In the application, the administrator who runs the program is presented with a choice of whether to add or delete an item class (step 202). If the administrator chooses to add an item, the administrator is then prompted for the name of the item class to add (step 204). The administrator is then prompted for the names of fields in the database which should be used to describe particular features of this class of item, and the size of each field. (step 206) For example, for an Employee item, such features or field names might be employee name, title, phone number, address, and e-mail address. It could also be the field name for the name of a CGI program to run to obtain features of the item or additional information to display. These are merely examples, the field names and number of fields is not limited by the application.

At step 208, the administrator is prompted for the name of the file containing the specific web page template or templates to be used when creating a specific instance of this class of item. The web page template or templates may be created before or after the item class is created, but they must be in place before a specific instance of the class is created. It is also within the sphere and scope of the invention that the user could choose from a selection of templates as to the style of web page created. In an alternate embodiment (not shown), the directory application can be programmed to prompt the administrator to include a picture or logo for each entry, which can also be used in a specific instance of the web page. The web page template may incorporate additional properties that enhance the functions of the web page relating to features of an added class of item. Any valid HTML command, item, or aspect may be incorporated in the web page template.

The name of the added class of item is then stored in the database, and the appropriate database table is created relating to this class of item. The procedure then terminates at step 214.

If at step 202, the administrator chose to delete a class of items, the administrator is then prompted to provide the name of a class of items to delete (step 210). At step 212, when the administrator has entered the name of the class of items to delete, the program removes that class of items, and the database table relating to that class of items.

Figure 3:
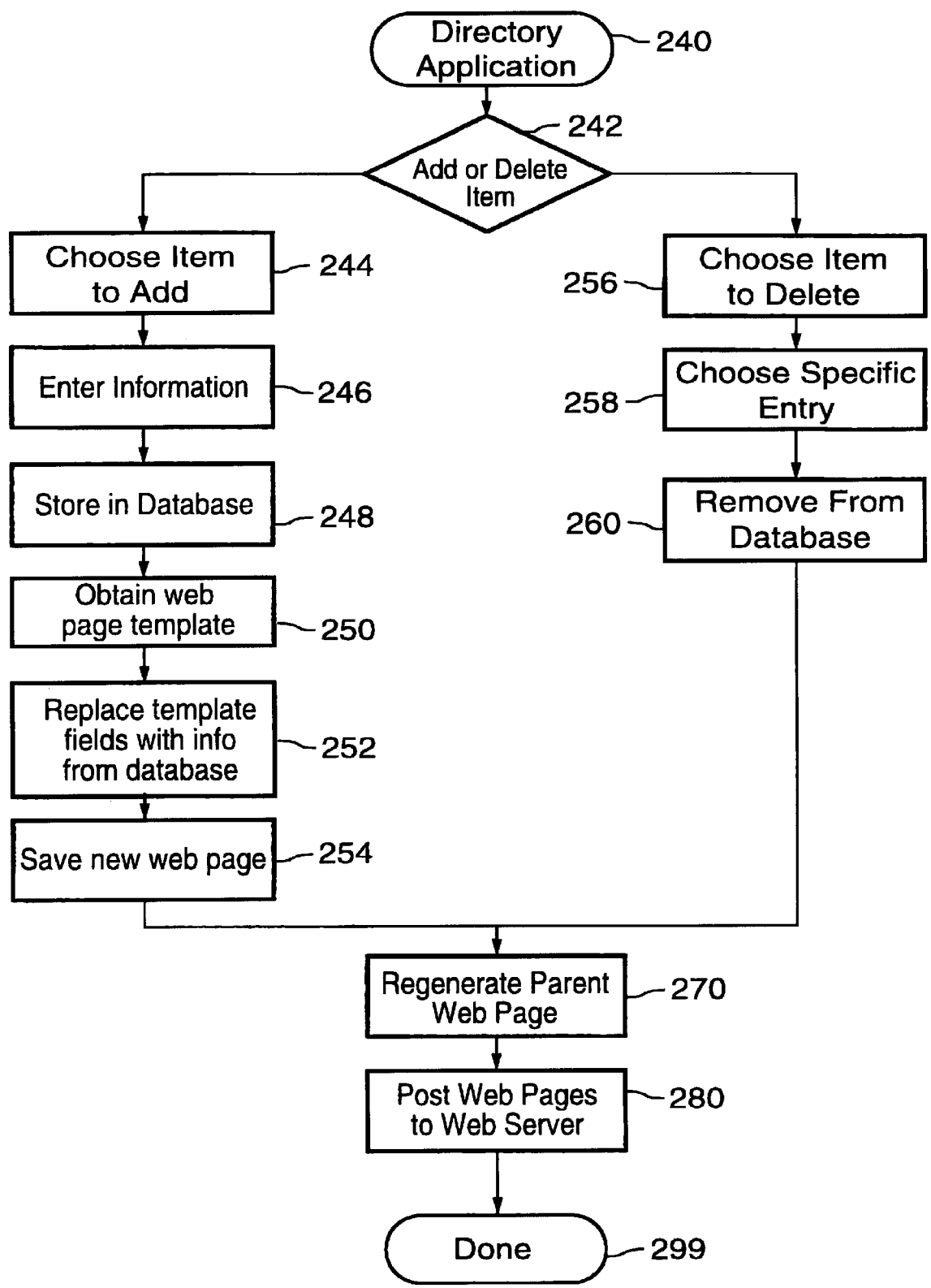
FIG. 3 is a flow chart of a further directory application according to the present invention showing the typical basic steps for adding or deleting a directory entry and generating the appropriate web pages.

Turning to FIG. 3, a flow chart example is provided of the directory application for adding or deleting a directory entry and generating the appropriate web page. At step 240, the directory application and web page generator is started on application server 120. In the application, the administrator who runs the program is presented with a choice of whether to add or delete an item (step 242). If the administrator chooses to add an item, the administrator is then presented with the choice of which category of item to add (step 244). The administrator then chooses from one of the classes of items that were created as described with respect to FIG. 2, above. For example, the administrator may choose to add an employee (step 244), in which case the administrator is then prompted for specific information on the employee to be inserted in the data base and displayed on the web pages. In an alternate embodiment, each of the above steps could be implemented as CGI programs that generate appropriate forms as necessary on a standard web browser used by the administrator to administer the program.

Figure 4A:
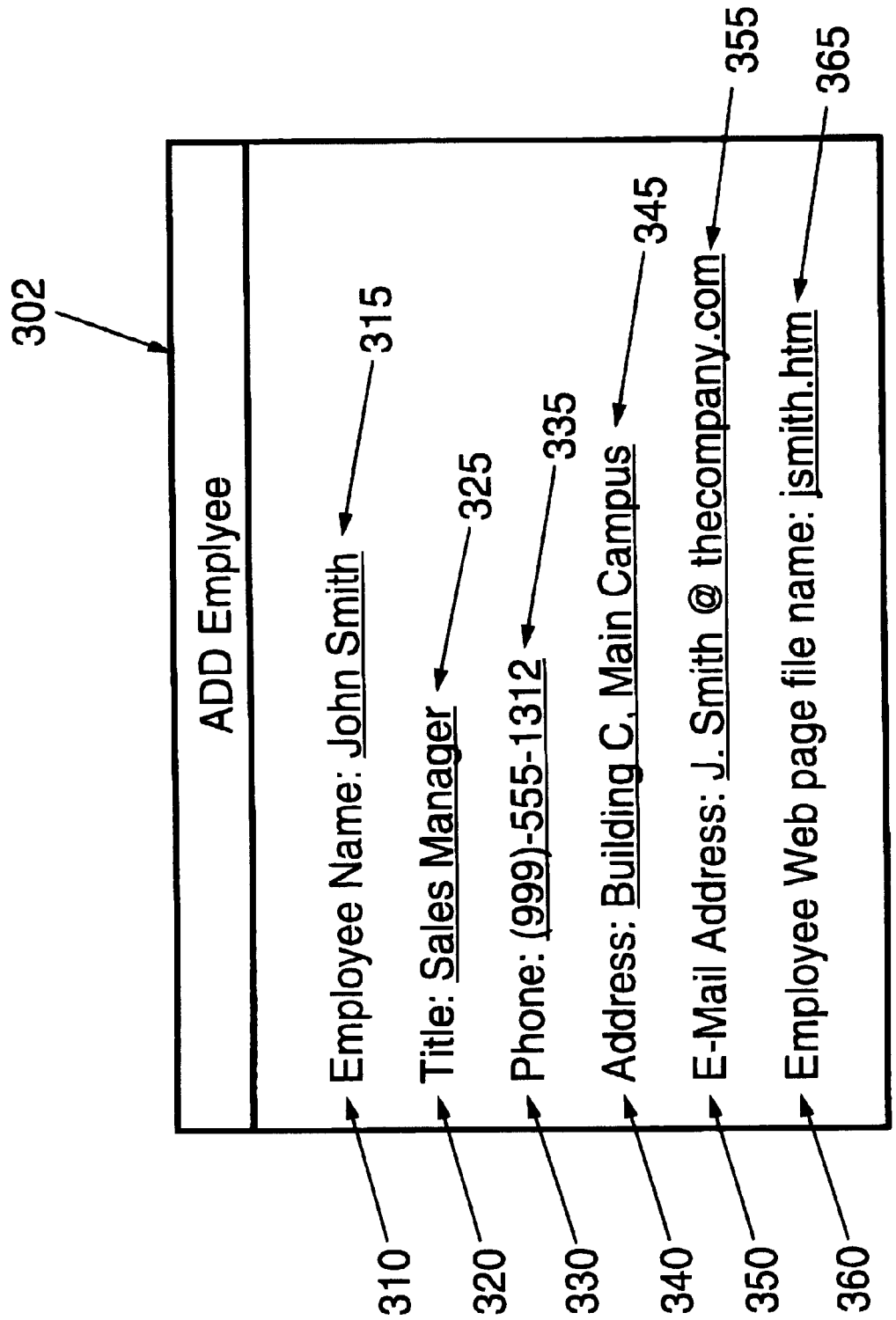
FIGS. 4a and 4b are example data entry screens for the directory applications of the present invention.

FIG. 4a illustrates an example data entry screen 302 to add an employee in accordance with step 246. It will be understood by a person of ordinary skill in the art that whereas, for the purpose of this example, the added item is an employee, other items and items of other classes which can have different numbers and types of fields, including CGI programs in fields, may be added in a similar manner. Field names 310, 320, 330, 340, 350 and 360 of FIG. 4A represent examples of fields in a data lo base table for storage of information regarding a specific item of the employee class. In the present example, the administrator enters the employee name 315, title 325, phone number 335, address 345, e-mail address 355 and employee web page file name 365 into the data entry fields. Returning to FIG. 3, once data entry is complete, the information is stored in the data base 125 (step 248).

At step 250, the web page generation is commenced by retrieval of the web page template, an example of which is illustrated in FIG. 5. The template of FIG. 5 is specified as the template file designated when this class of item was created (as described above with reference to FIG. 2). The template of FIG. 5 is merely an example and may be modified to add additional HTML code to add header, graphical information, stylistic items, or any valid HTML code or function to suit the desires of the administrator. Elements 415a, 415b and 415c correspond to the employee name 315 entered as illustrated in FIG. 4a. Likewise, elements 425, 435, 445, and 455 correspond to title 325, phone 335, address 345, e-mail address 355 and employee web page file name 365 entered as illustrated in FIG. 4a. The replacement of the various data elements into the template is done at step 252 of FIG. 3 and the generated web page is then saved at step 254 with the employee web page file name 365 entered as illustrated in FIG. 4a.

Figure 6:
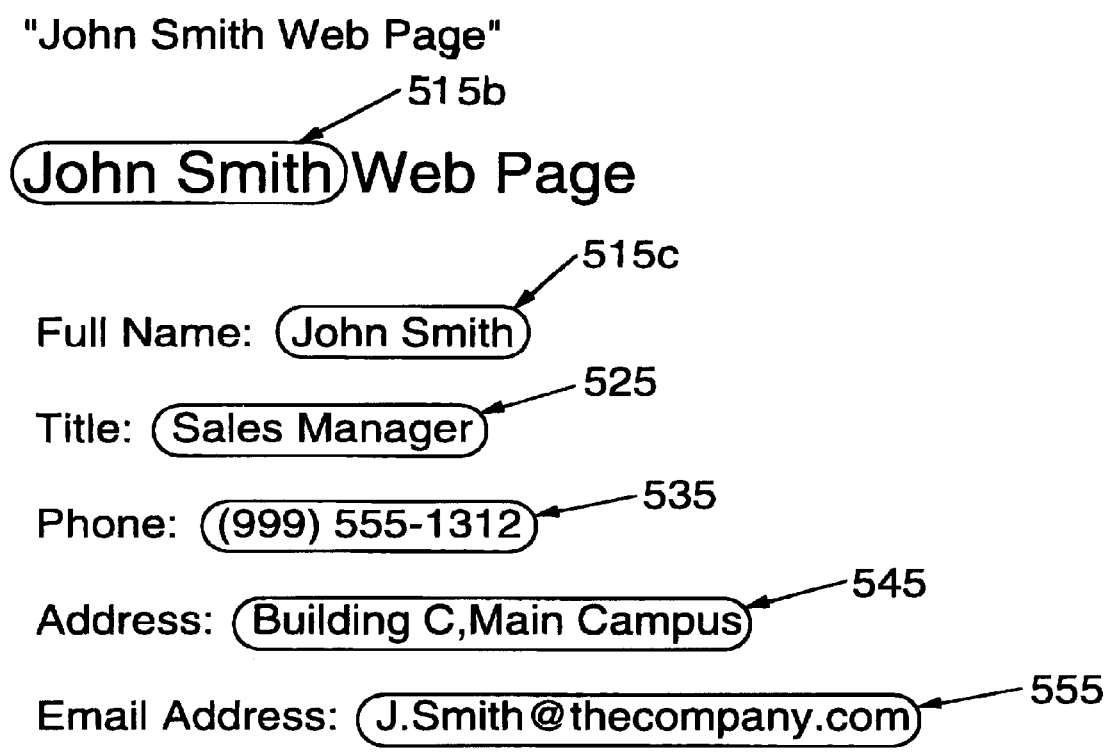
FIG. 6 is an example of the web page generated from the HTML code of FIG. 5.

Turning to FIG. 6, the web page generated from the HTML code of FIG. 5 is illustrated. Employee name elements 515b and 515c correspond to data entry elements 415b and 415c from FIG. 5. Likewise, data elements 525, 535, 545 and 555 correspond to elements 425, 435, 445, 455 from FIG. 5.

Returning to the data flow diagram of FIG. 3, the parent web page is then regenerated as illustrated in step 270. This step involves sequentially stepping through the entire data base 125 of employees to generate a list of employee names and their corresponding web page file names. A parent web page displaying all of the employee names and providing links to each associated individual employee web page in then generated.

FIG. 7 illustrates example HTML code for a parent web page providing a list of employees. As an example, employee names 615 and 699, are inserted in the template from information stored in the data base at step 248 of the flow chart of FIG. 3. Likewise, web page file names 665 and 698 are retrieved and inserted in the template in the data base from information stored at step 248 of the flow chart illustrated in FIG. 3. Employee names 615 and 699 and employee web page file names 665 and 698 are merely examples of some of the employee names and employee web pages listed in the data base. Entries similar to employee web page file name 698 and employee name 699 are required to be inserted for each employee entry in the data base. Once all of the employees have been included in the template, the parent web page HTML code is then saved to disk within server 120.

Returning to the flow chart of FIG. 3, the employee web pages and parent web page are then copied to or posted to the web server 110 for storage in memory 130, as illustrated at step 280. The web pages are then available to be displayed by the web server 110. The directory application and web page generator terminates at step 299.

Turning to FIG. 8, the web page generated from the HTML code of FIG. 7 is illustrated. This represents a typical parent web page that a local user 160 or remote user 170 might see. Employee name elements 715 and 798 correspond to data entry elements 615 and 699 from FIG. 7. In this example, the names are underlined, indicating that when a local user 160 or remote user 170 accesses this web page and clicks on a particular name, such as name element 715, the appropriate associated web page corresponding to that employee are then downloaded and displayed to the user.

Figure 4B:
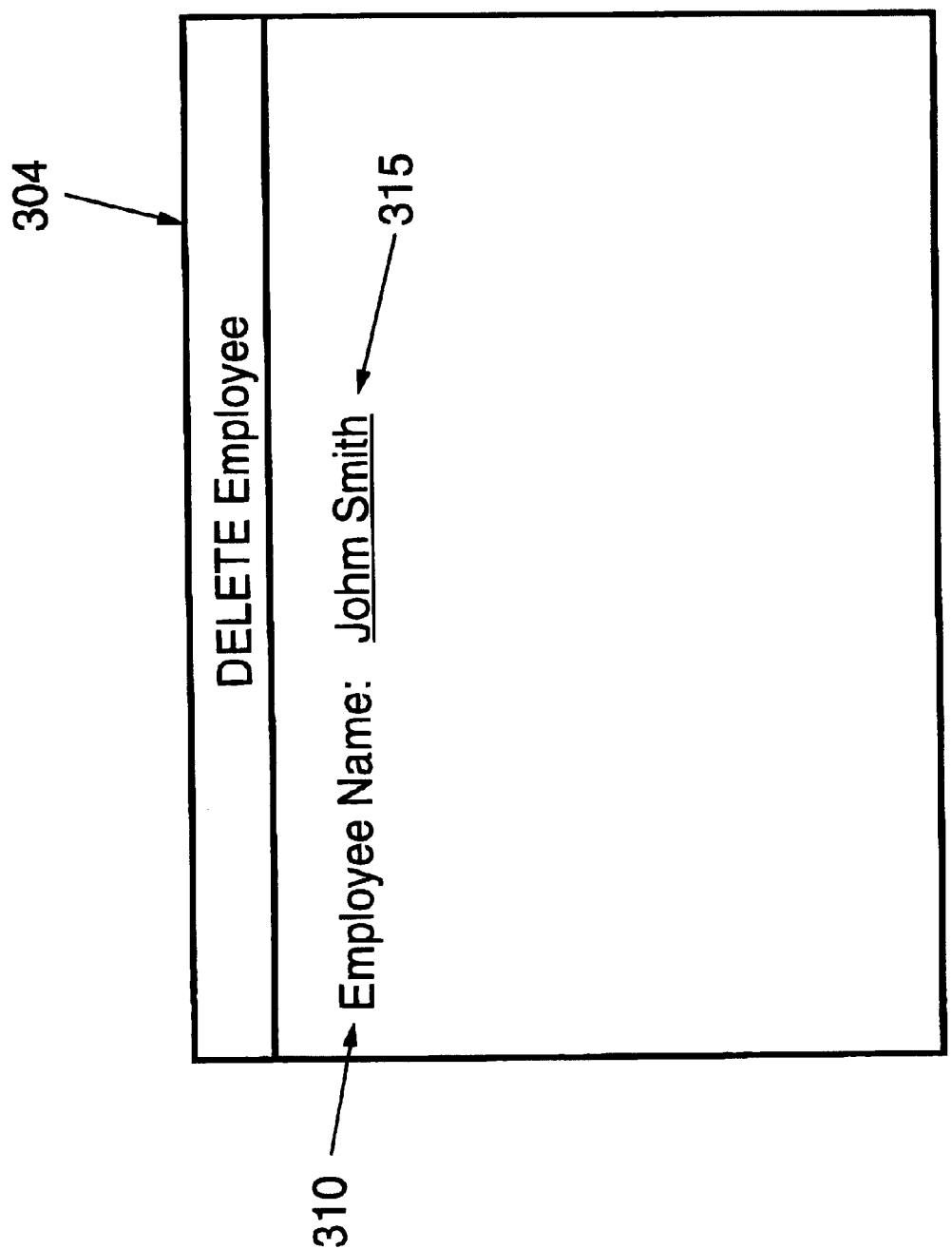

Returning to step 210 of the flow chart in FIG. 3, if the administrator chooses to delete an item, the choice must then be made regarding which item should be deleted as illustrated at step 256. In this example, the administrator chooses to delete an employee. At step 258, the administrator must choose which specific employee to delete. This is further illustrated on the "DELETE EMPLOYEE" screen 304 of FIG. 4b. Employee name 310 is displayed on the screen and the administrator types in the name of the specific employee 315 to be deleted from the data base and from the web pages. Once the specific employee 315 had been entered, that record is removed from the data base as illustrated at step 260 of FIG. 3. At step 270, the parent web page must then be regenerated so that the specific employee that has been deleted does not appear on the parent web page. The web page generator program then proceeds to steps 280 and 299 as described above.

In an alternate embodiment of the present invention, the web page generator can operate to dynamically generate and display the web page directory from either an existing source of directory information or one created by a procedure described above. This implementation is particularly useful where the data changes rapidly, and allows for the generation and posting of web pages as they are needed, instead of generating web pages with every change to the underlying data. In the circumstances where the directory information already exists, the only requirement is that the fields of the directory information be accessible by a CGI program. With respect to using the procedure described above, this could be performed in the following manner. Returning to FIG. 3, the administrator would add information regarding a directory entry as previously described in steps 240, 242, 244, 246 and 248. The routine would them terminate at step 299.

A parent web page is set up that contains a selected link which when activated, handles the display of the requested database information. But, instead of the pre-generated web page containing the list of the items in the database, it is associated with the location and name of a CGI program to be run. Execution of CGI programs in this manner is well known is the art. When the local user 160 or remote user 170 actuates the link, the associated CGI program is executed. The CGI program queries the application database 125, extracts the relevant information from the application database 125, and formats and returns the information as a dynamically prepared web page. As a result, the web pages returned to the user are dynamically prepared on an as requested basis and always reflect the most current information in the application database 125.

This embodiment is particularly useful in circumstances where the basic data for the present invention already exists as part of some other unrelated computer application. The necessity to maintain a separate, duplicate body of information is removed as the actual direct source of the information could be used as the basis for the web page generator of the present invention. This further reduces the demand of and in some cases can remove the need for an administrator.

In a further embodiment of the invention, which extends and expands on the dynamic generator and display of web pages utilizing CGI programs described above, the CGI programs could be written to query, obtain, format and return information from devices and resources that frequently change status. For example, upon actuation of a link by a local user 160 or remote user 170, an associated CGI program could be written to query the status of a device, such as a private branch exchange telephony switch to determine the status or features of a particular line on the telephony switch and return them to the local user 160 or remote user 170 as a dynamically generated web page. Thus, local user 160 or remote user 170 could determine, through the mechanism of a dynamically generated web page of the present invention whether a particular individual is on the phone. Furthermore, a web phone interface could be set up, through the use of a CGI program between a local user 160 or remote user 170 and a person listed on a directory page generated by the present invention. These are merely examples of features which could be implemented in conjunction with devices and the web page generator of the present invention.

It is within the scope and sphere of the invention that the web pages created and generated by the invention could be cascaded, such that classes of items may also be grouped together to create a superclass, and pages for specific items can be linked to sub-pages. A parent page for these superclasses can be created to obtain access to classes of items. The method and manner in which such superclasses of web pages or sub-pages of web pages can be created is similar to the method described with respect to FIGS. 2 to 8 and the alternate embodiments described above.

In an alternative embodiment, web pages generated according to the method of the present invention can be incorporated or linked to a master web page for an organization or enterprise. Appropriate software, which is well within the capability of a software programmer, can be written as a front-end application to allow searching of the directory web-pages created by the method of the present invention. A local user 160, or remote user 170 could utilize such search software to locate the name of a desired employee, and then have the appropriate web page which was generated by the method of the present invention displayed to the user. The web-pages generated by the invention can be used as part of an automatic attendant for people to find members of the organization and to communicate with them.

In a further alternative embodiment, the template web pages discussed with respect to FIGS. 2–8 can incorporate applications that are embedded into the web pages generated by the method of the present invention by utilizing a downloadable platform independent application, such as a Java program. Java is a hardware independent interpreted language from Sun Microsystems® whose programs can be incorporated in HTML pages, thereby enabling mini-programs called "applets" to be downloaded from a server, such as the web server 110 of FIG. 1, and run on client machines. This additional functionality can be incorporated into the web pages generated by the method of the present invention and utilized by a local user 160 or remote user 170, using a Java-enabled browser. The benefit of this alternative embodiment is that a sophisticated organizational directory may be maintained by an administrator without the necessity of the administrator having in-depth programming experience.

For example, when a local user 160 or remote user 170 accesses the web server 110 and uses the organizational directory generated by the present invention to find someone, the user must "click" on the person's name and the person's associated web page is the displayed to the user. The displayed web page can include a "call" and a "mail" button. If the local user 160 or remote user 170 "clicks" on the "call" button, then the person is "called" using an associated web phone applet. Such web phone applications are well known in the art. If the local user 160 or remote user 170 "clicks" the "mail" button, then a mail message can be composed, using an email applet, such as is known in the art, and sent to the person whose web page is being displayed. These features can easily be incorporated into the system of the present invention by one of ordinary skill in the art by modifying the item class routine in FIG. 2 to prompt for the name of one or more applets to associate with the item class. In order to provide the functions described above, the template as described by FIG. 5 can easily be modified by one of ordinary skill in the art of writing such applications to facilitate the display and operation of the desired buttons, and execution of the desired Java applet.

In addition, modifications in a like manner can be made so that a status button appears on the web page generated by the method of the present invention for each person so as to give the "status" of the person whose web page is being displayed (e.g. out of town, busy, idle, do not disturb, et cetera).

Furthermore, a web page may be generated for a room or resource in the manner described with respect to FIGS. 2–8 and an appointment scheduling applet can be incorporated into the web page for the room or resource generated by the method of the present invention. Thus, a room or resource can be booked using the generated web page, with calendar status being visible on the web page. Resources, (i.e. rooms, overhead projectors, et cetera), can also be added to the organizational directory and may also have their own web page to show status. Project rooms can be set up automatically, where groups which provide organizational support (e.g. human resources or documentation), can be provided with a web page per client (project) where information can be posted and updated. For example, if one project has two people to hire, then that project may have generated a joint HR web page, where the HR rep can post status, new resumes etc., and a user can request interviews to be set up, et cetera. Once created, these web pages use existing technology for access and display and posting information. Java applets can be written to accomplish these tasks.

It is also within the sphere and scope of the present invention to add features such as video calls, shared workspace, voice messaging, and fax, to the web pages generated according to the method of the present invention so as to enable communication between the local user 160 or remote user 170 and the desired person in the organization. The alternatives and contemplated additional features are not meant to be exhaustive, but merely indicative of the alternatives and features that can be implemented in accordance with the present invention.

In yet a further alternative embodiment of the invention, the web-pages generated by the present method may be designed to interface with a PBX 180 (FIG. 1). By utilizing a platform independent downloadable application, such as a Java applet, a communication back to the PBX 180 from a local user 160 or remote user 170 may be provided for enhanced telephony notification and control via the web pages generated by the method of the present invention. This allows for additional functionality and features such that a sophisticated organizational web page directory may be generated by the method of the present invention for communication with a PBX. This sophisticated web page organizational directory may be maintained by an administrator without the necessity of the administrator having in-depth programming experience or knowledge of programming a PBX. The facilitation of connections between a Java enabled browser and a PBX is further described in Canadian patent application no. 2187240, filed Oct. 7, 1996, entitled Network Control of Telephone Services Using Downloadable Applications, pending.

For example, a communications group can be added into the organizational directory as an item class in the manner described with respect to FIGS. 2–8. The templates of FIGS. 5 and 7 can be modified by one skilled in the art so that Java type applets that communicate with the PBX 180 are written and incorporated into the templates. In this manner, hunt groups and key line groups on the PBX can be set up within a web page. In the case of a key line group, the template for members of the organization (e.g. employee) can be set up such that every member is provided with a line status indicator on their personal web page. When the appropriate downloadable platform independent application button is pressed by a local or remote user, the associated Java applet is then downloaded and run to communicate with the PBX 180 to determine the telephone status and features of that user's set, and to display those settings on the web page. Such settings can optionally be changed by a user with appropriate security clearance. Virtually any PBX feature, for example, call forwarding, call screening, or the call preferences for the person, can be added to an individual's web page, and easily generated by an administrator utilizing the automatic web page generator application of the present invention.

Although the invention has been described in terms of the preferred and several alternative embodiments described herein, those skilled in the art will appreciate other embodiments and modifications which can be made without departing from the sphere and scope of the teachings of the invention. All such modifications are intended to be included with the scope of the claims appended hereto.

We claim:

1. A method for automatic generation of a web page organizational directory comprising:

a) creating and saving a member web page template and parent web page template each containing fields for storing specific information;

b) inputting member information into a directory database for each of a plurality of members;

c) retrieving said member web page template and said member information from said database;

d) for each of said plurality of members, replacing said fields in said member web page template with said member information and saving said member web page template with said fields replaced with said member information as a member specific web page;

e) retrieving said parent web page template;

f) for each member in said database, inserting said member information regarding each said member from said database into said fields of said parent web page template and creating links to associate each member whose member information has been inserted into said fields of said parent web page template to said member specific web page to create a new parent web page; and g) posting each said member specific web page and said parent web page to a web server.

2. The method of claim 1 wherein said member information includes a reference for locating a digital picture of each said member, said digital picture being displayed when said member specific web page is accessed.

3. The method of claim 1 wherein said member web page template and parent web page template are written in HTML code.

4. The method of claim 1 wherein each said member specific web page is linked to at least one sub-page.

5. The method of claim 1 wherein at least one of said member web page template and said parent web page template includes code to run one or more downloadable platform independent applications.

6. The method of claim 1 wherein at least one of said member web page template and said parent web page template includes code to communicate with a private branch exchange telephone switch.

7. A method for automatic generation of a web page organizational directory comprising:

a) inputting and saving member information into a directory database for each of a plurality of members;

b) creating one or more associative data gathering and formatting mechanisms for searching said directory database, generating in web page format, a list of selected elements relating to each of said members and sending said list to a requesting unit;

c) creating and saving a parent web page template containing one or more activation fields that is each associated with one of said data gathering and formatting mechanisms for activating said associated data gathering and formatting mechanism;

d) posting said parent web page template to a web server;

e) activating said activation field on said parent web page from said requesting unit;

f) displaying said directory list on said requesting unit.

8. The method of claim 7 wherein each of said elements is a several level activation field and linked to associate each of said elements to another of said data gathering and formatting mechanisms.

9. The method of claim 7 wherein each data gathering and formatting method is a CGI program.

10. In an environment where directory information is accessible on a network device, a method for automatic generation of a web page organizational directory comprising:

a) creating one or more data gathering mechanisms for accessing, searching and retrieving directory information from said network device and delivering said information to a data formatting mechanism;

b) creating one or more said data formatting mechanisms for generating in web page format a list of selected elements received from said data gathering mechanism and sending said list to a requesting unit;

c) creating and saving a parent web page template containing one or more activation fields for activating one of said data gathering mechanisms;

d) posting said parent web page template to a web server;

e) activating said activation field on said parent web page from said requesting unit;

f) displaying said directory list on said requesting unit.

\* \* \* \* \*

UNITED STATES PATENT AND TRADEMARK OFFICE
CERTIFICATE OF CORRECTION

PATENT NO.: 5,940,834
DATED: Aug. 17, 1999
INVENTOR(S): Pinard et al

It is certified that error appears in the above-identified patent and that said Letters Patent is hereby corrected as shown below:

In column 1 line 14 delete "networked" and insert --network-- therefore.

Signed and Sealed this

Twentieth Day of June, 2000

Attest:

Q. TODD DICKINSON

*Attesting Officer*     *Director of Patents and Trademarks*